(12) United States Patent
Mull

(10) Patent No.: US 6,898,575 B2
(45) Date of Patent: May 24, 2005

(54) SYSTEMS AND METHODS FOR CHARITABLE DONATING

(76) Inventor: George W. M. Mull, 1012 38th St., Sacramento, CA (US) 95816

( * ) Notice: Subject to any disclaimer, the term of this patent is extended or adjusted under 35 U.S.C. 154(b) by 179 days.

(21) Appl. No.: 10/275,747

(22) PCT Filed: May 10, 2001

(86) PCT No.: PCT/US01/15222
§ 371 (c)(1),
(2), (4) Date: Nov. 8, 2002

(87) PCT Pub. No.: WO01/86564
PCT Pub. Date: Nov. 15, 2001

(65) Prior Publication Data
US 2004/0039649 A1 Feb. 26, 2004

Related U.S. Application Data

(60) Provisional application No. 60/203,003, filed on May 10, 2000.

(51) Int. Cl.[7] .............................................. G06F 17/60
(52) U.S. Cl. ............................ 705/39; 705/39; 705/30; 705/35
(58) Field of Search .............................. 705/30, 35, 39

(56) References Cited

U.S. PATENT DOCUMENTS 5,953,710 A * 9/1999 Fleming ....................... 705/38
6,052,675 A * 4/2000 Checchio .................... 705/44
6,609,654 B1 * 8/2003 Anderson et al. ........... 235/379

FOREIGN PATENT DOCUMENTS

WO    WO 9611449 A1 * 4/1996

OTHER PUBLICATIONS

0051020292 Eric No. ED221138 Clearinghouse No.: HE015489—an Introduction to Annuity, Caritable Remainder Trus and Request Programs. Second Edition. Dunseth, Willliam B.; Corp. Source: Council for Advancement and Support of Education, Washington, DC. (B.*

* cited by examiner

Primary Examiner—James P. Trammell
Assistant Examiner—Daniel L Greene

(57) ABSTRACT

An electronic donor directed charitable donation system designed specifically for the WWW/Internet whereby donors can direct the disposition of donations. Participating charitable institutions can identify goods and services needed and donors can donate money to be applied for those specific needs by the institutions. The system also provides an aggregation of participating merchants that provide goods and services needed by the charitable institutions that can be purchased by such institutions with a system debit card.

28 Claims, 3 Drawing Sheets

SYSTEMS AND METHODS FOR
CHARITABLE DONATING

RELATED APPLICATIONS

This application is related to and claims priority from provisional application Ser. No. 60/203,003 filed May 10, 2000, which is incorporated by reference as if fully set forth herein.

BACKGROUND OF THE INVENTION

1. Field of the Invention

The invention relates generally to charitable donating and more particularly to systems and methods for charitable donating that provide the donor with increased control over how the donor's donations are used.

2. Background

Charitable donating has gone on for a long time. Many charities put on telethons to increase donations and exposure to new potential donors. More recently, charitable organizations have turned to the Internet to increase their exposure to potential donors and to make it easier for donors to donate.

Present methods of donating allow donors to donate for causes they support. But these methods do not allow the donors to specifically target their donations. The traditional donor also cannot track the use of their donation to monitor precisely how it is spent. For example, a common concern is that donations do not make their way to the intended recipients, either because the resources are diverted to other purposes or because too large of a percentage goes to administrative costs associated with the charitable organization. It is especially difficult for the donor to make small donations, for very targeted purposes of the donor's choosing, and to monitor and track the use of the donations.

Moreover, there are many causes to which donors would like to donate, but for which the traditional methods of charitable donating are not suited. For example, many parents or relatives would like to donate to their child's classroom, but such donations are not currently practical, because: (1) a donation to a teacher is not presently deductible; (2) such donations are not anonymous; (3) gifts to school districts, while deductible, are not guaranteed to benefit the child's classroom; (4) there is no convenient mechanism for donating; and (5) there is no way for the donor to track the use of the donation and ensure it is used appropriately.

While use of the Internet for charitable donating has increased the type and amount of charitable donating, many of the problems described above still exist.

SUMMARY OF THE INVENTION

According to one aspect of the invention, a method of charitable donating comprises setting up an account in the name of a donee, receiving a donation directed to the account from a donor, and depositing the donation into the account. Then a charge against the account to cover a purchase made by the donee is received and the amount of the purchase is deducted from the account. In addition, account access can be provided to the donor so that the donor can track the purchase and other transactions involving the account.

According to one embodiment, the method further comprises generating a report of activity in the account for the donor.

According to another embodiment, the method further comprises generating a receipt of the donation for the donor.

According to still another embodiment, the method further comprises providing a debit card to the donee to use in making the purchase.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

In order to combat the problems relating to charitable donating mentioned above, the system and methods described herein provide an online system that allows donors to make donations, for very targeted purposes of the donor's choosing, and to monitor the use of the donations. In particular, the systems and methods for charitable donating allow a donor, such as a parent or relative, to donate funds to their child's classroom. The child's teacher can then access the funds to purchase items needed for the classroom. Further, the donor can see where the money is spent and know that it is actually reaching a particular child's classroom. The donor may also be an entity, such as a family foundation, public charity or corporation.

While the discussion that follows relates generally to classroom donations such as just described, it will be apparent that the system and methods described herein apply to other types of charitable donating as well. Thus, the systems and methods for charitable donating can also be used for making donations for targeted purposes to specific charitable organizations, from a child's sport team or club to an international relief organization.

Figure 1:
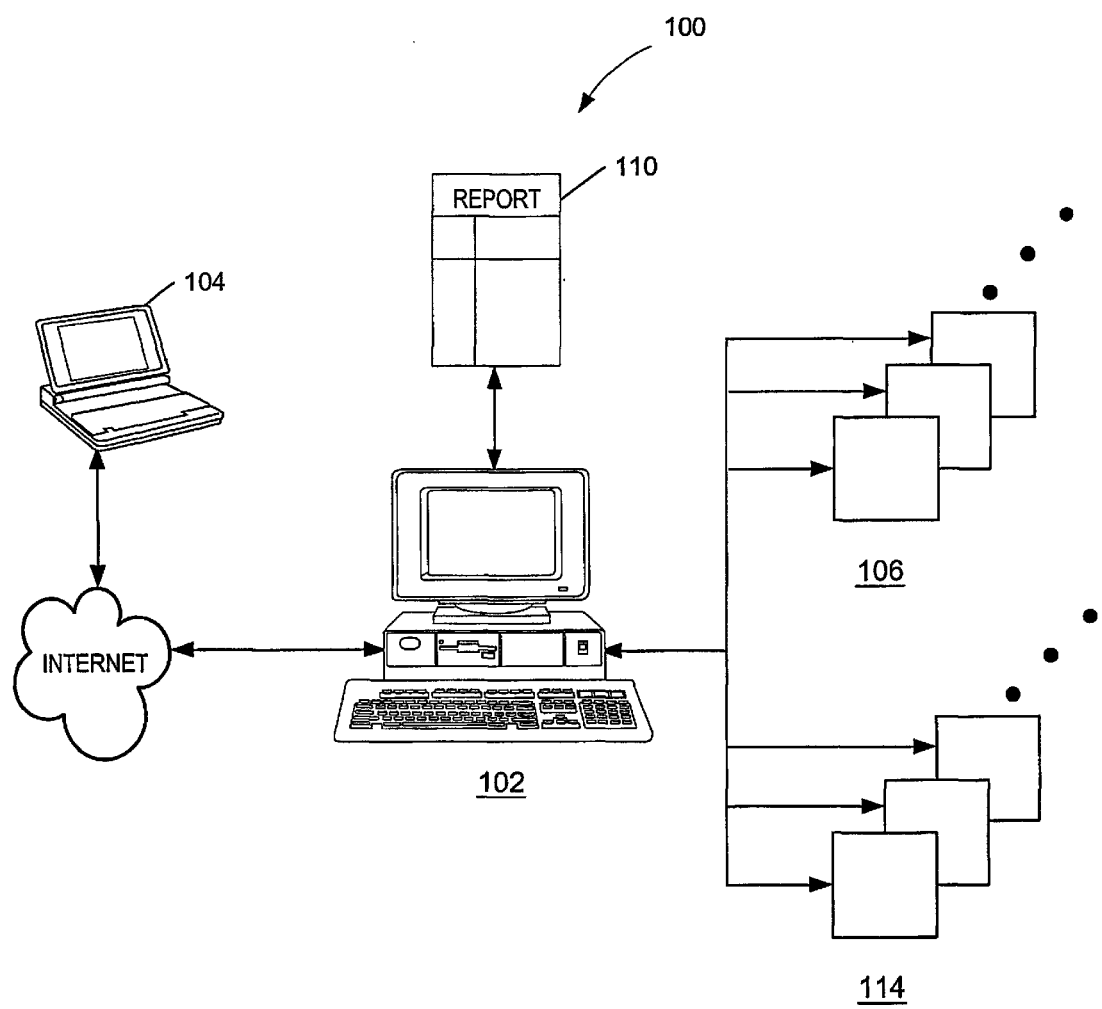
FIG. 1 is a diagram illustrating one example embodiment of a system for charitable donating in accordance with the systems and methods for charitable donating.

FIG. 1 illustrates a system 100 designed in accordance with the systems and methods for charitable donating. The central component of system 100 is server 102, which is interfaced to the Internet and is configured to host an online site that enables charitable donating in accordance with the system and methods described herein. Donors and donees use a terminal, such as terminal 104, to connect to server 102 and access the online site. Server 102 manages a plurality of accounts 106 that are set up for individual donees. Donors can access server 102, through a terminal 104, and select which account they would like to donate to.

Terminal 104 can preferably be a desktop or laptop computer, or any other device with wired or wireless access to the Internet. Alternatively, server 102 can be accessed by telephone. In this case, voice menus and commands are used to navigate through the site and make elections.

Figure 3:
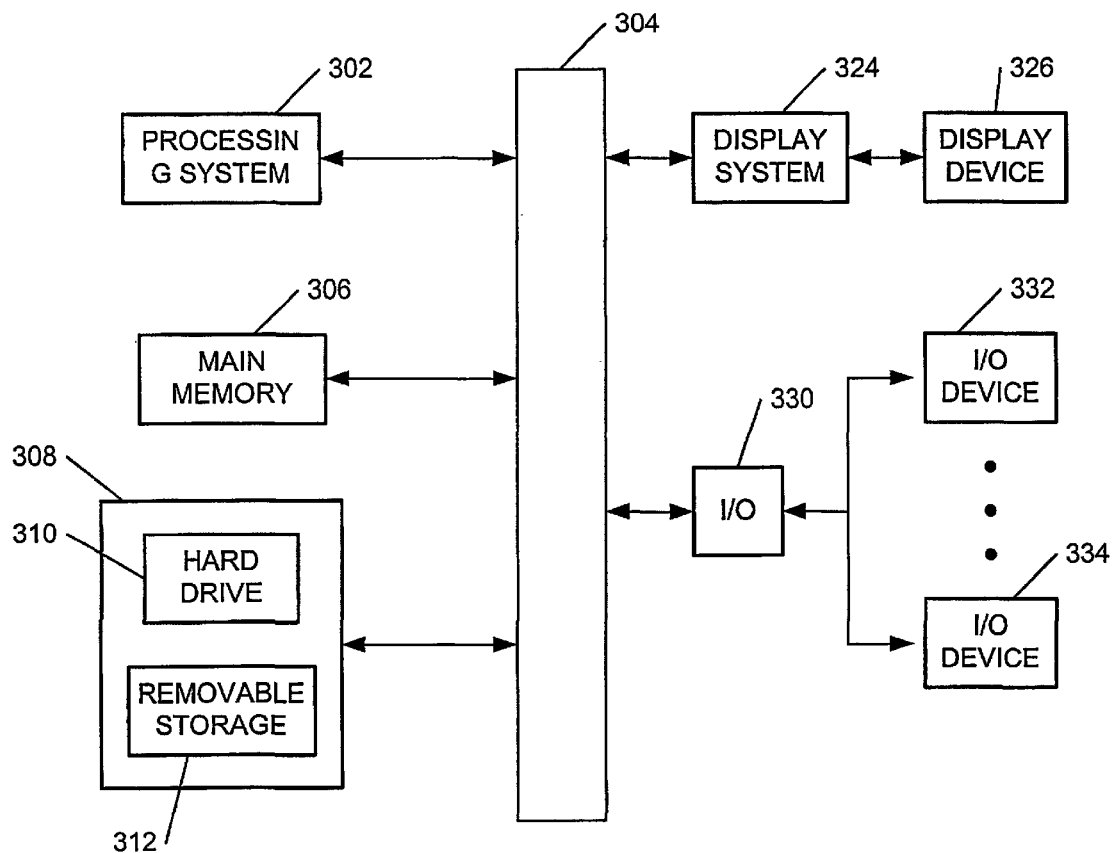
FIG. 3 is a logical block diagram illustrating a sample computer system that can be used in conjunction with the system of FIG. 1 and the processes of FIG. 2.

FIG. 3 illustrates an exemplary computer system 300 that can be interfaced to the Internet. All or part of system 300 can form all or part of server 102 and/or a desktop or laptop computer used to access server 102. FIG. 3 and the description that follows are provide as a general illustration of the types of systems and components that a terminal or server connect to the Internet require. As such; FIG. 3 should not be seen as limiting the systems and methods described herein. Nor should it be seen as requiring a specific type of computer architecture.

The computer system 300 includes a processing system 302, which controls the computer system 300. Processing system 302 includes a central processing unit such as a microprocessor or microcontroller for executing programs, performing data manipulations and controlling tasks in the computer system 300. Alternatively, processing system 302 includes one or more additional processors.

Such additional processors can include an auxiliary processor to manage input/output, an auxiliary processor to perform floating point mathematical operations, a digital signal processor (DSP) (a special-purpose microprocessor having an architecture suitable for fast execution of signal processing algorithms), a back-end processor (a slave processor subordinate to the main processing system), an additional microprocessor or controller for dual or multiple processor systems, or a coprocessor. These additional processors can be discrete processors or can be built in to the central processing unit.

Processing system 302 is coupled with a communication bus 304. Communication bus 304 includes a data channel for facilitating information transfer between storage and other peripheral components of computer system 300. Communication bus 304 further provides a set of signals required for communication with processing system 302, including a data bus, address bus, and control bus. Communication bus 304 can also comprise any known bus architecture according to promulgated standards. These bus architectures include, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, IEEE P1394, Universal Serial Bus (USB), Access.bus, Apple Desktop Bus (ADB), Concentration Highway Interface (CHI), Fire Wire, Geo Port, or Small Computer Systems Interface (SCSI).

Computer system 300 also includes a main memory 306 and can include a secondary memory 308 as well. Main memory 306 provides storage of instructions and data for programs executing on processing system 302. Main memory 306 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), and ferroelectric random access memory (FRAM), can also comprise all or part of main memory 306.

Secondary memory 308 can provide storage of instructions and data that are loaded into main memory 306. Secondary memory 308 can be read-only memory or read/write memory and can include semiconductor-based memory and/or non-semiconductor based memory. For example, secondary memory 308 can comprises a semiconductor-based read-only memory (ROM).

Secondary memory 308 can comprise, for example, a hard disk drive 310 and/or a removable storage drive 312. Removable storage drive 312 preferably represents various non-semiconductor based memories, including but not limited to a floppy disk drive, a magnetic tape drive, an optical disk drive, etc. Although, removable storage drive 312 can comprise semiconductor based removable drives such as removable Flash based storage devices. In any event, removable storage unit (not shown) includes a computer usable storage medium having stored therein computer software and/or data.

Computer system 300 can also include a display system 324 for connecting to a display device 326. Display system 324 can comprise a video display adapter having all of the components for driving the display device, including video random access memory (VRAM), buffer, and graphics engine as desired. Display device 326 can also comprise a cathode ray-tube (CRT) type display such as a monitor or television, or may comprise alternative display technologies such as a liquid-crystal display (LCD), a light-emitting diode (LED) display, or a gas or plasma display.

Computer system 300 further includes an input/output (I/O) system 330 for connecting to one or more I/O devices 332–334. Input/output system 330 can comprise one or more controllers or adapters for providing interface functions between one or more of I/O devices 332–334. For example, input/output system 330 can comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled, device (CCD) reader, scanner, compact disc (CD), digital versatile disc (DVD), video capture device, touch screen, stylus, electroacoustic transducer, microphone, speaker, etc.

As mentioned, the basic system and components illustrated in FIG. 3 are preferably used, in whole or in part, by server 102 and any computing device used to access server 102.

Figure 2:
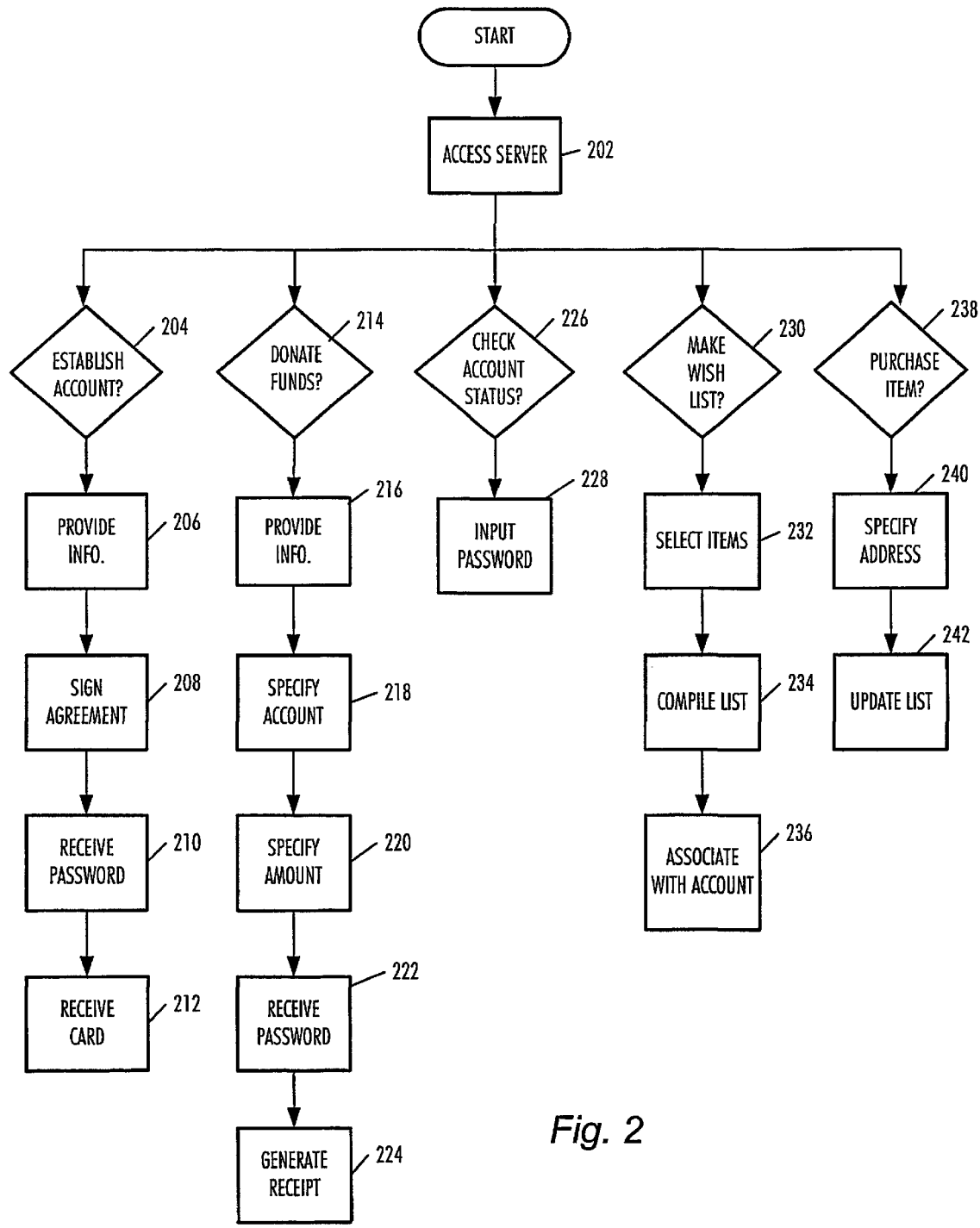
FIG. 2 is a flow chart illustrating some example processes implemented by the system of FIG. 1.

FIG. 2 is a flow chart illustrating some of the activities managed by server 102. First, in step 202, a donor or donee must access server 102; however, the donee preferably must first access server 102 in order to establish a particular account (step 204). Although the donee described herein is an individual, namely, a teacher, the donee may also be an entity, such as a public charity or a nonprofit organization or agent thereof. Moreover, the "donee" may also refer to both an individual donee and an entity that hold the account jointly. Thus, if the donee is a teacher, the teacher must access server 102 and establish an account. Establishing an account will require the teacher to provide identity and authentication information in step 206.

Each account is preferably a trust account. Therefore, in step 208 the teacher is required to submit a signed trust agreement whereby the teacher covenants to use all funds donated to the account for the specific charitable purpose of the account. To accomplish this, the teacher may, for example, be required to download a form from the online site, sign it, and return the form before the account can be activated. Alternatively, the online site may have electronic signature capabilities, in which case the teacher can read and sign the agreement online. If a telephone is used to access server 102, then a verbal ascent can be solicited and recorded, or the teacher/donee can request that the form be, for example, sent to them through the mail. This trust agreement signed by the donee allows the donations made into that donee's account to be tax-deductible.

Moreover, a donee can set up an account for himself or herself, or for a particular activity, such as a school trip to the zoo.

In step 210, once the account is established, the donee can be provided a password, key, or other means that allows the donee to access the account online, for example, to check the balance of the account.

Funds in the account are preferably accessed using a debit or charge card. Thus, in step 212, the teacher is preferably provided a debit card for the account. The debit card is preferably used only for purchases as opposed to cash withdrawals. This way, server 102 can maintain a record of each purchase charged against the account. Thus, in FIG. 1, server 102 maintains a record 110 of transactions for each of the plurality of accounts 106.

Moreover, a donor to the account who has accessed server 102 can elect to access the record 110 in step 226. Accessing record 110 preferably requires that the donor provide, in step 228, a password, or some other authentication, before access is granted.

The process by which the donor acquires a password or means of authentication is also illustrated in FIG. 2. When a donor, e.g., a parent, decides to donate to an account, the donor accesses server 102, in step 202, and specifies they are a donor in step 214. The donor is then asked to supply identification and authentication information in step 216. The donor must also supply billing information for the donations that the donor wishes to make.

In one embodiment, the donor can input billing information through keys on the donor's terminal. The billing information may be a credit card number, a debit card number, or some other financial account information, and may include residence information for billing purposes.

It should be noted that sending account information over the Internet can lead to concerns over security of the information. To allay these concerns, third party verification and/or security services can be used to improve the security related to the account information. In addition, public key cryptography can be used to ensure that the transaction is a secure transaction.

Cryptography uses mathematical algorithms to encrypt and decrypt data. The algorithm is individualized for a particular person, application, or service through a "key." Public key encryption refers to a certain type of algorithm and a certain method of individualization. One example of a public key cryptography approach is public key infrastructure (PKI). This approach uses a known, widely distributed public key and a different private key known only to the person, application, or service that owns the keys to encrypt and decrypt messages.

PKI is explained in RSA Security's white paper entitled "Understanding Public Key Infrastructure (PKI)," available at http://www.rsa.com and incorporated herein by reference in its entirety.

Once the donor is registered in this manner, the donor can specify the account to which they wish to donate in step 218. Preferably, the donor is presented with a list of the plurality of accounts 106 from which the donor can select the account to which they would like to donate. And, in step 220, the donor specifies the amount they would like to donate.

In step 222, the donor receives a password, key, or other means that allows them to subsequently access server 102 online and obtain information about the account(s) to which they have donated. For example, it was mentioned previously that the donor can check a record 110 of account transactions. In addition, the online site may be configured to support an online forum for the donor and donee to communicate with each other. For example, the online site can be configured to serve as a platform so that donors, during or after step 220 in which they specify the amount donated, may express their preferences as to how the donated finds are used. Moreover, this platform could provide the donees opportunities to present their needs, to explain their expenditures, or to generally keep donors informed of the status of the account or charitable cause.

The site can be further configured to inform donors of the leveraged value of their individual donations. This leveraged value can take into account any matching funds and special discounts, for example, each of which will be discussed more fully below.

In addition to the ability for donors to specify what items they wish their donations to be used for, the site can also be configured so that donors can specify that the funds be used as a salary supplement. This aspect is particularly directed to teachers, which many believe are underpaid. If this is the case, then the account can be treated differently than the accounts described above, for example, in order to allow the teacher to withdraw cash and/or to disable tracking of expenditures. Additionally, a separate receipt can be generated for these types of accounts.

In step 224, server 102 can be configured to generate a receipt for the donation that the donor can use for tax purposes. This is potentially a valuable feature of the systems and methods for charitable donating, because it may allow these targeted donations to become tax-deductible.

It should be noted that if several individuals donate to a particular account, it may complicate the ability of a particular donor to track the use of his funds. It can also raise issues of privacy if all donors have access to the account record 110. The systems and methods for charitable donating can deal with such concerns in several ways. For example, the donee can establish several different accounts, or the server 102 can be configured to automatically set up "sub-accounts" within a donee's established account, e.g., one for each donor. Alternatively, the online site can be configured such that a donor can establish the account, donate the funds, and specify a donee to have access to the account. The donee would then access the site, provide the requisite information, and agree to any terms of use, before they would be given a password or key and granted access to the account.

In lieu of or in addition to establishing charitable accounts, the site can be configured so that the donee creates a "wish list" (see step 230) of items they would like to have purchased for them. To facilitate this ability, the site can be configured to allow merchants to log onto server 102 and register as affiliates with the site. These merchants can then make products and services available from which the donees can select in creating their wish lists in step 232.

The site can be configured such that donees follow "links" to the affiliate merchant's own sites when selecting/looking for particular items. Alternatively, the items available from affiliate merchants can be compiled and maintained on server 102.

In step 234, the selections are compiled into a list by server 102 and the lists can be associated with the correct account in step 236. In this case, when a donor access server 102, the donor is presented with not only a plurality of accounts 106 to which the donor can chose to donate, but also, within each account, a plurality of wish lists 114 from which the donor can chose to purchase items in step 238. Accessing the wish list preferably requires the donor to supply a password or authenticating information. Thus, as mentioned, the wish lists 114 are preferably associated with the accounts 106 so that the same authentication information needed to access the accounts can be used to access the wish lists.

When purchasing an item from the wish lists online, the donor can be directed to the affiliate merchant's site. But preferably, the purchase is handled or at least tracked by server 102. This way, server 102 can track such purchases for tax purposes and generate a receipt, as with donations to accounts, for the donor. Therefore, this is another way for donors to make small, highly targeted, tax deductible, charitable donations.

It is also preferable for server 102 to handle online purchases from affiliates so that the billing information provided by the donor in step 216 can be used, without the need for the donor to repeatedly input billing information when using the site to purchase items from the wish lists.

Another reason it is preferable that online purchases be handled through the site hosted by server 102 is that it allows server 102 to process the purchase and submit a final price to the merchant. Thus, any discounts previously negotiated with the merchant as well as any transaction fees or affiliate fees can be automatically deducted. Discounts, transaction fees, and affiliate fees will be discussed in more detail below.

In step 240, the donor is preferably given the option to supply a mailing address for the item purchased from the wish list. This way, the donor can choose to have the item shipped directly to the donee, or the donor can have the item shipped to them. The donor can then, for example, make a gift of the item in person at a specific time or event.

In step 242, server 102 updates the wish list, for example, to remove the item purchased.

In addition to purchasing wish list items, donors can shop for other items available from the affiliated merchants for the donee. Moreover, the site can be configured to allow donors to shop for themselves with a percentage of the sale price being donated in whole or in part to a particular account. The sale percentage that is rebated in this manner is often termed an affiliate fee.

As mentioned above, donees may be able to purchase items from affiliate merchants at a discount. One way to handle the discounts is for server 102 to handle the purchase and remit a final price to the merchants after accounting for any negotiated discounts. This is effective for online purchases, but for purchases made in person, the debit card provided to the donee can be a "smart card." In this case, the card can be programmed to automatically apply a negotiated discount, or other special benefit, to a particular purchase. The debit card can even act as an identification that allows the donee to obtain the discount or other special benefit, even when the donee uses a payment method other than the debit card associated with their account.

It should also be mentioned that while the funds in each account are held in trust for access by the donee, the donee does not gain any vested right in the funds. Therefore, if the donee is a teacher, and the teacher quits, is fired, retires, dies, or is no longer associated with the particular class for any reason, the funds in that account can be transferred to another account or returned to the donor. For example, in the event of a teacher leaving the classroom, the funds can be transferred to an account in the name of the new teacher or to an account in the name of the school principal. In fact, for teacher accounts, the site can be configured to establish an account in the name of the principal and automatically transfer the finds to this account in the event that a teacher leaves a particular classroom. In this case, the site can also be configured to allow the donor to override this automatic transfer.

Alternatively, the account may be a joint account owned by an individual donee and an entity, such as a nonprofit organization, that acts as a trustor to the extent that it has enforceable rights to the funds in the account. Thus, the entity has the right to transfer funds out of the account and/or return them to the donor, if the trust account is breached or the donee is fired, dies, etc.

The site can also be configured to facilitate the donation of appreciated securities. With the coordination of on-line brokerage services, for example, securities can be donated to a given account, sold, and the proceeds directed to the account. Further, the donor can also choose to direct dividends or interest from particular holdings to a particular account.

A matching funds program can also be instituted through the site. For example, a large corporation may decide to match all funds donated to teacher accounts. In this case, the corporation may or may not be able to access the account information. If the corporation is to be able to access the account information, then it will need to register and be provided a password or other authentication means as described above.

The preceding discussion has described how the online site hosted by server 102 functions in relation to donors, donees, and merchants. But there are also several ways, in accordance with the systems and methods for charitable donating, for the online site to generate revenue.

One way the site can generate revenue is to charge an account maintenance fee. The fee can, for example, be charged monthly, quarterly or yearly. The fee can be deducted directly from the account or can be billed to the donor or donee depending on how the account is set-up.

Another way to generate revenue is to charge a small transaction fee for each purchase made by the donee. In addition, a transaction fee can be charged for all wish list purchases, or other purchases made by donors, and an affiliate fee can be charged for purchases from the wish list or purchases made by the donors.

Further, interest on all funds deposited can go to the site, into the accounts, or some combination thereof.

Advertising can also be used to generate revenue, especially if the site is used as a forum for donee-donor interaction as this will mean that donors and donees are regularly accessing the site and would be targetable for advertising purposes.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method of tax-deductible charitable donating via a computer network, the method comprising the steps of:

setting up an account in the name of a donee teacher or other direct provider of charitable services via the computer network;

using a trust agreement form restricting the use of the account to the advancement of charitable purposes by the donee;

receiving donations from multiple donors directed to the account;

depositing the donations from multiple donors into the account;

receiving a charge against the account to cover a purchase made by the donee;

deducting the amount of the purchase from the account;

providing a mechanism for the donee to explain to the donors how each purchase advanced a particular charitable purpose; and providing account access to the donors so that the donors can track the purchases and other transactions involving the account via a computer network.

2. The method of claim 1, further comprising the step of:
generating a report of activity in the account for the donor.

3. The method of claim 1, further comprising the step of:
generating a receipt of the donation for the donor.

4. The method of claim 1, further comprising the step of:
charging the donor or the donee a maintenance fee for maintaining the account.

5. The method of claim 1, further comprising the step of:
charging a transaction fee for the purchase and deducting the transaction fee from the account.

6. The method of claim 1, further comprising the step of:
receiving instructions for the use of the donation from the donor.

7. The method of claim 1, further comprising the step of:
receiving a plurality of selections from the donee designating items that the donee would prefer to have purchased for the donee or for the donee's use;
generating a list from the selections; and
associating the list with the account.

8. The method of claim 1, further comprising the step of:
negotiating a discount price with an affiliate merchant for the purchase made by the donee.

9. The method of claim 1, further comprising the step of:
providing a debit card to the donee for the donee to use in making the purchase.

10. The method of claim 1, further comprising the steps of:
downloading the trust agreement form via a computer network by the teacher or other direct provider of charitable services;
printing the trust agreement form;
signing the trust agreement form by the teacher or other direct provider of charitable services; and
returning the trust agreement form by the teacher or other direct provider of charitable services.

11. The method of claim 1, further comprising the step of:
reviewing the trust agreement via a computer network by the teacher or other direct provider of charitable services: and
entering into a trust agreement utilizing an electronic signature.

12. The method of claim 1, further comprising the steps of entering into the trust agreement by the teacher or other direct provider of charitable services:
utilizing a telephone to access the computer network by the teacher or other direct provider of charitable services:
soliciting of the teacher or other direct provider of charitable services to enter into the trust agreement:
receiving a verbal ascent by the teacher or other direct provider of charitable services; and/or
facilitating a request by the teacher or other direct provider of charitable services, the trust agreement is sent to the teacher or other direct provider of charitable services through the mail.

13. A method of tax-deductible charitable donating via a computer network, the method comprising the steps of:
setting up an account in the name of a teacher or other direct provider of charitable services via a computer network;
entering into a trust agreement with the donee restricting use of the account to the advancement of charitable purposes;
receiving a plurality of selections from the donee designating items that the donee would prefer to have purchased for the donee or for the donee's use in advancement of a particular charitable purpose;
generating a list from the selections;
associating the list with the account; and
receiving an election from a donor to purchase an item from the list for the donee's use.

14. The method of claim 13, further comprising the steps of:
receiving instructions from the donor to ship the elected item to the donee or to the donor;
purchasing the item;
shipping the item to either the donee or the donor; and
charging the donor for the purchase.

15. The method of claim 4, further comprising the step of:
charging a vendor from which the elected item is purchased a commission.

16. The method of claim 4, further comprising the step of:
generating a receipt for the purchase for the donor.

17. The method of claim 4, further comprising the steps of:
downloading the trust agreement form via a computer network by the teacher or other direct provider of charitable services;
printing the trust agreement form;
signing the trust agreement form by the teacher or other direct provider of charitable services; and
returning the trust agreement form by the teacher or other direct provider of charitable services.

18. The method of claim 4, further comprising the step of:
reviewing the trust agreement via a computer network by the teacher or other direct provider of charitable services: and
entering into a trust agreement utilizing an electronic signature.

19. The method of claim 4, further comprising the steps of entering into the trust agreement by the teacher or other direct provider of charitable services:
utilizing a telephone to access the computer network by the teacher or other direct provider of charitable services;
soliciting of the teacher or other direct provider of charitable services to enter into the trust agreement:
receiving a verbal ascent by the teacher or other direct provider of charitable services; and/or
facilitating a request by the teacher or other direct provider of charitable services, the trust agreement is sent to the teacher or other direct provider of charitable services through the mail.

20. A computer readable medium having stored thereon one or more sequences of instructions for causing one or more processors to perform steps for implementing charitable donating via a computer network, the steps comprising:

setting up an account in the name of a donee via a computer network;

receiving a donation directed to the account from a donor; depositing the donation into the account;

receiving a charge against the account to cover a purchase made by the donee;

deducting the amount of the purchase from the account; and providing account access to the donor so that the donor can track the purchase and other transactions involving the account via a computer network.

21. The computer readable medium of claim 20, further comprising the step of:

generating a report of activity in the account for the donor.

22. The computer readable medium of claim 20, further comprising the step of:

generating a receipt of the donation for the donor.

23. The computer readable medium of claim 20, further comprising the step of:

charging the donor or the donee a maintenance fee for maintaining the account.

24. The computer readable medium of claim 20, wherein the steps further comprise charging a transaction fee for the purchase and deducting the transaction fee from the account.

25. The computer readable medium of claim 20, further comprising the step of:

receiving instructions for the use of the donation from the donor.

26. The computer readable medium of claim 20, further comprising the step of:

receiving a plurality of selection from the donee of items that the donee would prefer to have purchased for the donee or for the donee's use;

generating a list from the selections; and associating the list with the account.

27. The computer readable medium of claim 20, further comprising the step of:

providing a debit card to the donee for the donee to use in making the purchase.

28. The method of claim 9, wherein the debit card is a smart card; and wherein the smart card automatically applies any applicable discounts or special benefits when the donee makes the purchase.

* * * * *